United States Patent [19]

Ploeger

Best Available Copy

[11] E Re. 30,300

[45] Reissued Jun. 10, 1980

[54] ACOUSTICAL REFLECTOR FOR WIND INSTRUMENTS

[76] Inventor: Thomas L. Ploeger, 38457 James Dr., Mt. Clemens, Mich. 48043

[21] Appl. No.: 957,037

[22] Filed: Nov. 2, 1978

Related U.S. Patent Documents

Reissue of:

[64] Patent No.: 4,012,983
Issued: Mar. 22, 1977
Appl. No.: 611,700
Filed: Sep. 9, 1975

[51] Int. Cl.[2] ..... G10D 9/06

[52] U.S. Cl. ..... 84/400; 181/155; 181/191

[58] Field of Search ..... 84/400, 385; 181/153, 181/155, 191

[56] References Cited

U.S. PATENT DOCUMENTS

| | | | |
|---|---|---|---|
| 3,099,183 | 7/1963 | Alles | 84/400 |
| 3,429,215 | 2/1969 | Finch | 84/400 |
| 3,500,953 | 3/1970 | Lahti | 181/153 |

FOREIGN PATENT DOCUMENTS

| | | | |
|---|---|---|---|
| 374187 | 4/1923 | Fed. Rep. of Germany | 84/400 |

*Primary Examiner*—Stephen J. Tomsky
*Attorney, Agent, or Firm*—Barnes, Kisselle, Raisch & Choate

[57] ABSTRACT

A panel of acoustically reflective material is removably supported on the bell of a wind instrument by a bracket which is jointed so that selectively the panel can be, (1) angularly positioned to reflect the sound back to the player or in other directions, (2) moved toward and away from the bell to adjust reflection of the sound, (3) moved to a muting position, and (4) moved to a non-reflecting location.

14 Claims, 7 Drawing Figures

FIG. 1
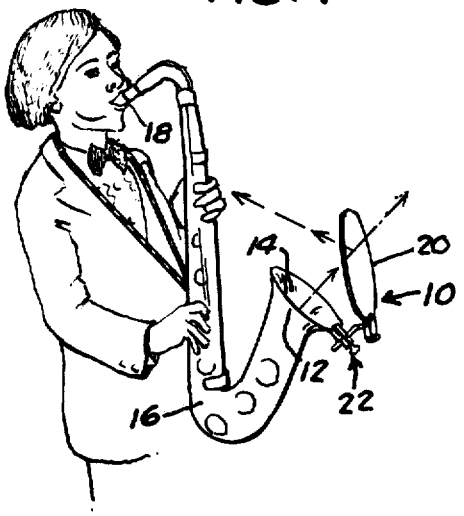
FIG. 2
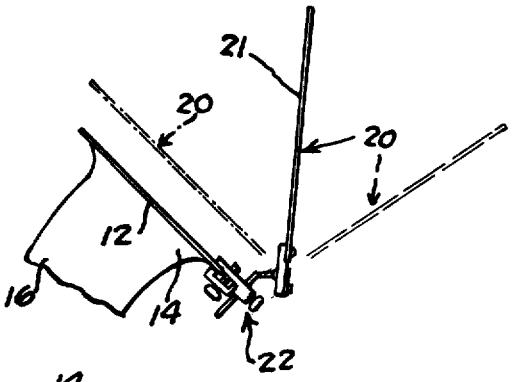
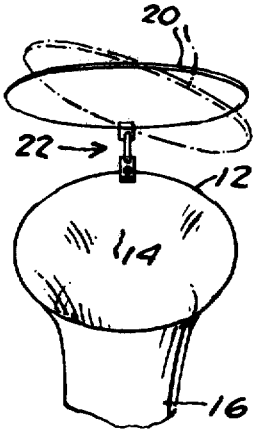
FIG. 3
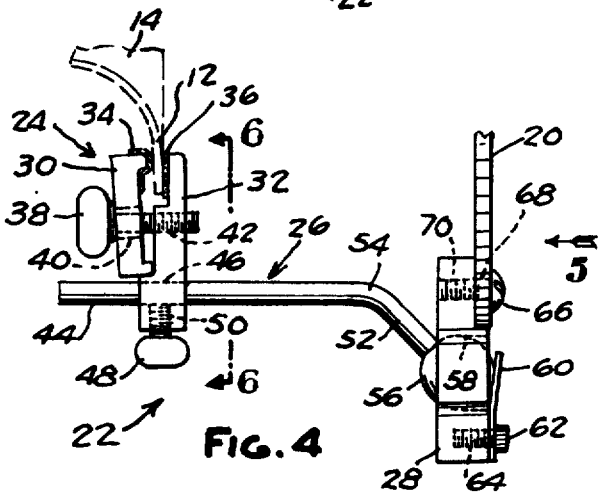
FIG. 4
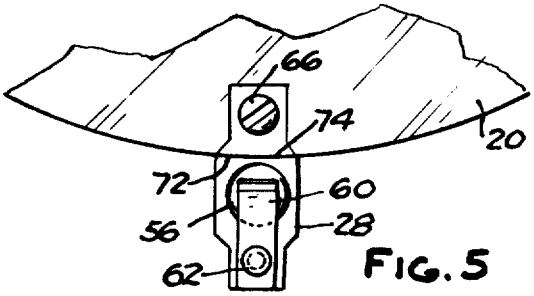
FIG. 5
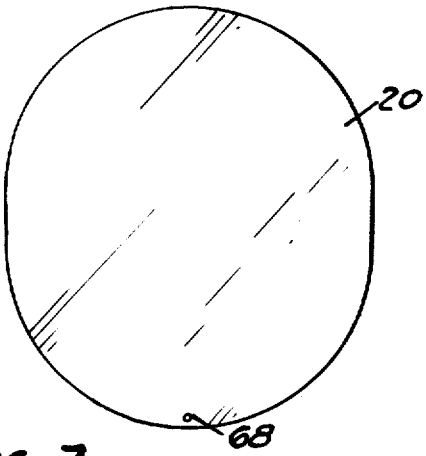
FIG. 7
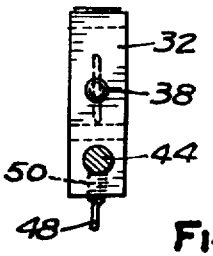
FIG. 6

ACOUSTICAL REFLECTOR FOR WIND INSTRUMENTS

Matter enclosed in heavy brackets [ ] appears in the original patent but forms no part of this reissue specification; matter printed in italics indicates the additions made by reissue.

This invention relates generally to wind instruments and, more particularly, to an acoustical reflector which enables the instrumentalist to reflect controllably the sound emanating from the bell of his instrument.

For a band, orchestra or other instrumental group to produce satisfactory sound, the various instruments must be played with accurate pitch, proper volume balance and proper tonal blend. This requires that each instrumentalist be able to hear his own instrument in relation to the other instruments in the group, which is difficult to do in locations such as the outdoors or in large halls where the acoustics are poor. The problem is aggravated where the instrument has a voice which is relatively soft in comparison to other instruments in the group. Even under relatively favorable conditions, it is sometimes difficult for an instrumentalist to hear his own instrument, if it is soft voiced. Insofar as I am aware, prior to my invention there existed no means for alleviating these problems.

The object of the present invention is to provide a relatively simple, inexpensive, lightweight acoustical panel structure which can be quickly and easily mounted detachably upon a wind instrument, the panel being selectively movable to various positions in front of the bell of the instrument for controllably reflecting the sound emanating from the bell to enable an instrumentalist to hear his own instrument in relation to other instruments of a group under various conditions. One form of the invention is shown in the accompanying drawings.

FIG. 1 is a perspective view of an acoustical reflector according to the present invention in use on a wind instrument.

FIG. 2 is a fragmentary, enlarged scale side elevational view of the reflector and wind instrument.

FIG. 3 is a fragmentary plan view of the reflector and wind instrument.

FIG. 4 is a further enlarged scale fragmentary view of the reflector and wind instrument.

FIG. 5 is an elevational view in the direction of arrow 5 of FIG. 4.

FIG. 6 is a sectional view on line 6—6 of FIG. 4.

FIG. 7 is a front elevational view of the acoustical reflector panel separate from the other parts.

Shown in FIG. 1 is an acoustical reflector assembly 10 according to the present invention mounted on the rim 12 of the bell 14 on a saxophone 16 having a mouthpiece 18. Assembly 10 includes a panel 20 which is supported on bell 14 by means of a bracket structure 22 which includes a clamp 24, a rod 26 supported by the clamp, and a mounting plate or block 28 to which the rod and panel 20 are connected. Panel 20 has an acoustically reflective surface 21 which in operative position faces generally toward bell 14.

Clamp 24 includes two members 30, 32 having opposed end portions which are padded at 34, 36 respectively with felt, rubber, plastic, or the like, for noninjuriously gripping rim 12 of the saxophone bell. The clamp members are secured in assembled relation by a thumb screw 38 which passes slidably through an opening 40 in member 32 and is threaded through a tapped opening in member 32 as at 42. Rod 26 has a leg portion 44 which passes slidably and rotatably through a socket opening 46 in clamp member 32. A thumb screw 48 is threaded through a portion of clamp member 32 at 50 for gripping engagement against leg portion 44.

Rod 26 has another leg portion 52 which is shorter than leg portion 44, and the two leg portions are interconnected at a bend 54. Leg 52 terminates in a ball 56 rotatably engaged in a spherical socket 58 in mounting plate 28 to form a universal joint between rod 26 and plate 28. The ball is held frictionally engaged within the socket by a leaf spring 60 pressed against it by means of a screw 62 threaded into an opening in plate 28 as at 64. Panel 20 is anchored onto plate 28 by a screw 66 which passes through an opening 68 and is threaded into plate 28 as at 70. The panel has a lower peripheral edge 72 which is engaged against a shoulder 74 on plate 28 to secure the panel against rotational movement on the plate.

Panel 20 can be formed of any relatively lightweight material, such as wood, sheet metal or plastic, and preferably its acoustically reflective surface 21 comprises simply a face of the panel. For the sake of appearance, it may be preferable that the panel be transparent. A suitable panel material is a clear plastic such as Plexiglass. The panel can have any one of numerous different shapes, such as round, rectangular, polygonal or the oval shape shown in FIG. 7. This shape has proven very satisfactory in use. It need not be as wide as the diameter of the mouth of bell 14, but its vertical dimension preferably should not be substantially less than the diameter of the bell mouth. By way of example, a panel 20 having a width of 6½ inches and a length of 7¼ inches functions satisfactorily on alto, tenor and baritone saxophones whose bell mouths are respectively about 4½ inches, 6 inches and 8–9 inches in diameter.

In use to mount reflector assembly 10 on saxophone 16, thumb screw 38 is turned to loosen clamp elements 30, 32 relative to each other. Padded ends 34, 36 of the clamp elements are positioned at opposite sides of rim 12 and screw 38 is then turned to cause the padded ends to grip rim 12 firmly therebetween.

Panel 20 can be manually turned both vertically and laterally about universal joint 56, 58. The panel is shown in FIG. 1 and in solid lines in FIG. 2 in a position in which sound emanating from bell 14 is reflected back toward the head of the instrumentalist. From this position the panel can be swung, for example, either to the left dotted line position of FIG. 2 for muting the instrument or to the right hand dotted line position wherein the panel is removed from alignment with bell 14 and has little or no effect on sound emanating from the bell. The panel can be turned laterally from the centered solid line position of FIG. 3 to canted positions, such as that shown in broken lines in FIG. 3, for reflecting sound to one side or the other of the instrumentalist.

Rod 26 extends generally parallel to the axis of bell 14. The general longitudinal spacing between the panel and bell mouth is adjusted by loosening thumb screw 48, sliding rod leg 44, one way or the other, within socket 46 and then retightening screw 48. From FIG. 1 will be seen that this adjustment generally raises or lowers panel 20 with respect to bell 14. This adjustment facilitates positioning the panel to minimize the amount of sound passing unreflected over either the top or under the bottom of the panel, thereby attaining maximum sound reflection.

When panel 20 is in a sound reflecting position such as in FIG. 1, its laterally reflective position can also be adjusted by loosening screw 48 and tilting the panel to the left or right. This causes rotation of leg 44 within socket 46 and consequent conical movement of leg 52 about the axis of leg 44 because of bend 54. Panel 20 follows this conical movement. For example, if the panel were tilted to the left or right from the solid line position of FIG. 3, it would also turn to face in that direction. After such an adjustment, screw 48 is retightened to secure the panel in adjusted position. This adjustment can be effected in combination with or independently of adjustments about universal joint 56, 58.

Bend 54 not only facilitates lateral adjustment of the panel described in the preceding paragraph, but also enables the panel to be swung to its non-reflecting position shown in the right hand dotted lines of FIG. 2 despite limitations in the extent of movement of universal joint 56, 58.

When panel 20 is in the position of FIG. 1, sound emanating from bell 14 and reflected from surface 21 can be clearly heard by the instrumentalist even in a poor acoustical environment and even though his instrument, in the present illustration a saxophone, has a voice which is relatively softer than other instruments in the group, such as trumpets and trombones. This ability to hear enables the instrumentalist to tune his instrument properly by adjusting the position of mouthpiece 18, and also enables the instrumentalist to achieve proper tonal and volume balance with respect to other instruments in the group and to maintain correct pitch. By adjusting panel 20 laterally to face either to the left or right, the instrumentalist can deflect sound toward adjacent instrumentalists to further facilitate proper balance and blend of the instruments. In some situations, panel 20 may be used to deflect sound toward a microphone. Also in some situations the panel in its sound reflecting position results in improved dispersion of the sound.

To remove assembly 10 from the instrument, it is only necessary to loosen thumb screw 38 and detach clamp elements 30, 32 from rim 12 of bell 14.

I believe that most commercial embodiments of my invention will utilize a substantially flat panel 20 and reflective surface 21. However, surface 21 could be convex or concave and panel 20 shaped accordingly without departing from the invention. The saxophone has been selected for illustration of the invention since that instrument is relatively soft voiced and the problems discussed above are relatively acute for saxophonists. However, the invention is equally applicable to brass and woodwind instruments in general with the possible exception of transverse instruments such as the flute. A typical assembly 10 according to my invention weighs about 5 ounces, and I estimate its cost of manufacture at about 4 dollars per assembly.

I claim:

1. In an acoustical reflector of the type having a panel with an acoustically reflective surface and bracket means on said panel including a clamp adapted to be mounted on the rim of the bell of a wind instrument for supporting said panel generally in front of the bell, improved structure wherein said bracket means comprises, a rod connected with said panel by means including an articulable joint, said clamp having means forming a socket which supports a portion of said rod, said socket being so oriented that when said clamp is mounted on the rim of the bell of an instrument with which said reflector is adapted to be used [when] the axis of said rod is generally parallel to the axis of the instrument bell, said rod portion being axially movable relative to said socket through a distance sufficient to facilitate locating said panel axially clear of the bell of the instrument when said panel is positioned in axial alignment with the bell, said rod portion being rotatable relative to said socket for swinging said panel about said rod axis when said panel is so located and positioned, and means effective to secure said rod against axial and rotatable movement relative to said socket.

2. The structure defined in claim 1 wherein said clamp has two members, one of which is provided with said socket.

3. The structure defined in claim 2 wherein said effective means comprises a screw threaded through a portion of said one clamp member and having an end engageable with a portion of said rod within said socket.

4. The structure defined in claim 1 wherein said rod has a bend between said portion and said joint to generate conical movement of said joint and panel upon rotation of said rod portion relative to said socket.

5. The structure defined in claim 4 wherein said joint is a universal joint.

6. In an acoustical reflector of the type having a panel with an acoustically reflective surface and bracket means on said panel including a clamp adapted to be mounted on the rim of the bell of a wind instrument for supporting said panel generally in front of the bell, improved structure wherein said bracket means comprises, a rod connected with said panel by means including an articulable joint, said rod and clamp being cooperable to support said panel in alignment with but axially clear of the bell of an instrument with which said reflector is adapted to be used, said rod being rotatable relative to said clamp for swinging said panel transversely of the instrument bell, said rod having a bend between said clamp and joint to generate conical movement of said joint and panel upon rotation of said rod relative to said clamp.

7. The structure defined in claim 6 wherein said rod has an intermediate portion extending away from both ends of said bend, one intermediate portion terminating at said clamp and being longer than the other intermediate portion.

8. The structure defined in claim 7 wherein said intermediate portions are substantially straight.

9. The structure defined in claim 8 wherein said joint is a universal joint.

*10. In an acoustical reflector of the type having a panel with an acoustically reflective surface and bracket means on said panel including a clamp adapted to be mounted on the rim of the bell of a wind instrument for supporting said panel generally in front of the bell, improved structure wherein said bracket means additionally comprises,*

*first means having a longitudinal axis and connected with said panel by means including an articulable joint,*

*second means in said clamp for slidably supporting a portion of said first means,*

*said second means being so oriented that when said clamp is mounted on the rim of the bell of an instrument with which said reflector is adapted to be used, said axis of said first means is generally parallel to the axis of the instrument bell,*

*said portion of said first means being axially slidable relative to said second means through a distance sufficient to facilitate locating said panel axially of the bell of the instrument when said panel is positioned in axial alignment with the bell,*

*said first means including said articulable joint being constructed to permit said panel to rotate relative to said clamp for swinging said panel about an axis parallel to the bell axis when said panel is so located and positioned,*

*and means in said bracket means effective to secure said panel against axial and rotatable movement relative to said clamp.*

*11. An acoustic reflector adapted to be mounted on the bell of a wind instrument comprising a panel having a*

*plane reflective surface and bracket means including a clamp adapted releasably to grip the rim of an instrument bell and means extending from said clamp to said panel so as to position said plane reflective surface generally in front of the bell opening when said clamp is affixed to a said bell rim, said means extending from said clamp including first means for adjustably positioning said reflective surface axially of the bell opening and second means separate from said first means both for adjusting the angular orientation of said plane reflective surface with respect to the axis of the bell opening and for rotating said reflective surface about an axis parallel to the bell axis to swing said panel and said reflective surface away from said bell opening.*

*12. The acoustic reflector set forth in claim 11 wherein said second means comprises a ball-in-socket universal joint.*

*13. The acoustic reflector set forth in claim 10, 11 or 12 wherein said panel is oval having a longer dimension cantilevered from said bracket means.*

*14. The acoustic reflector set forth in claim 13 wherein said panel is of transparent plastic construction.*

* * * * *